Feb. 7, 1967  R. MATHENEY  3,302,831
BEVERAGE DISPENSING STANDS
Filed March 8, 1965  2 Sheets-Sheet 1
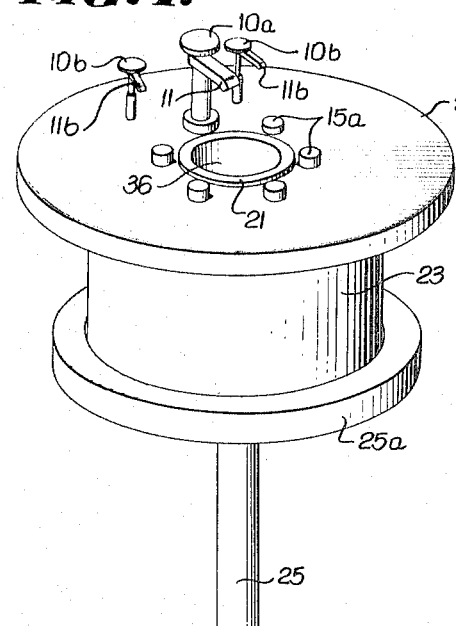
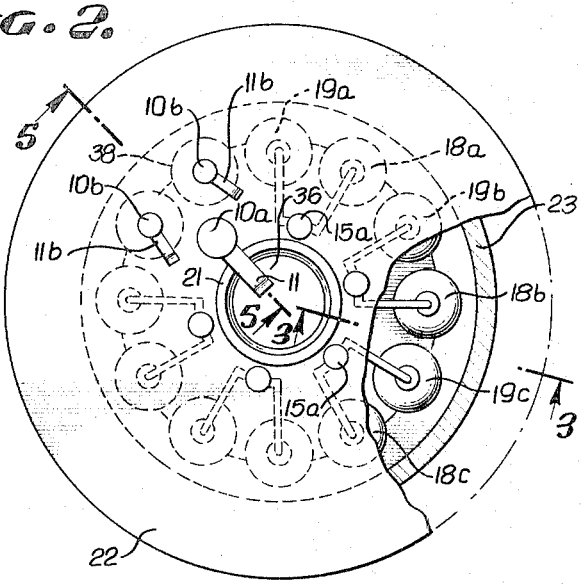
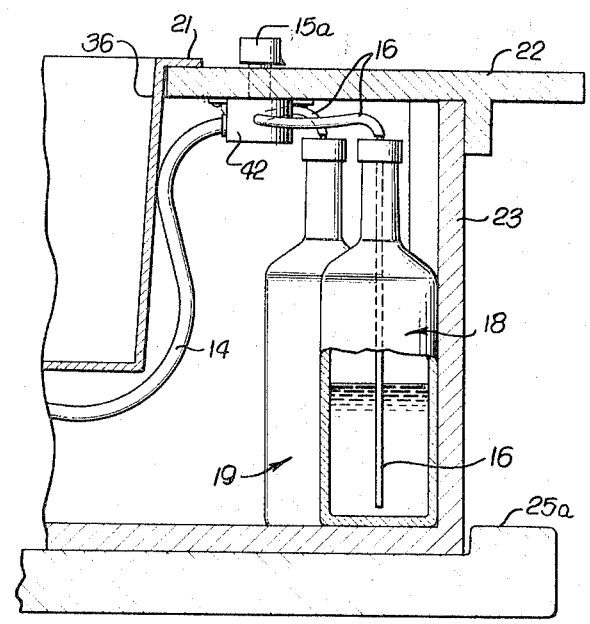
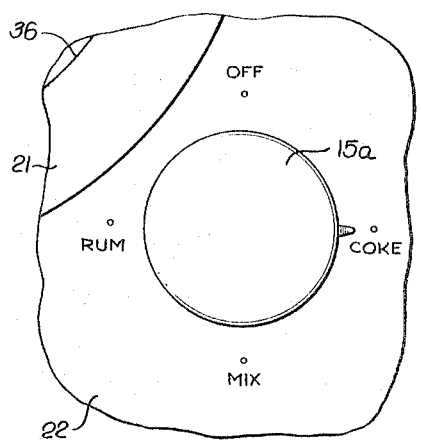
RICHARD MATHENEY
INVENTOR.
BY Stevens, Robert Stevens
ATTORNEYS.

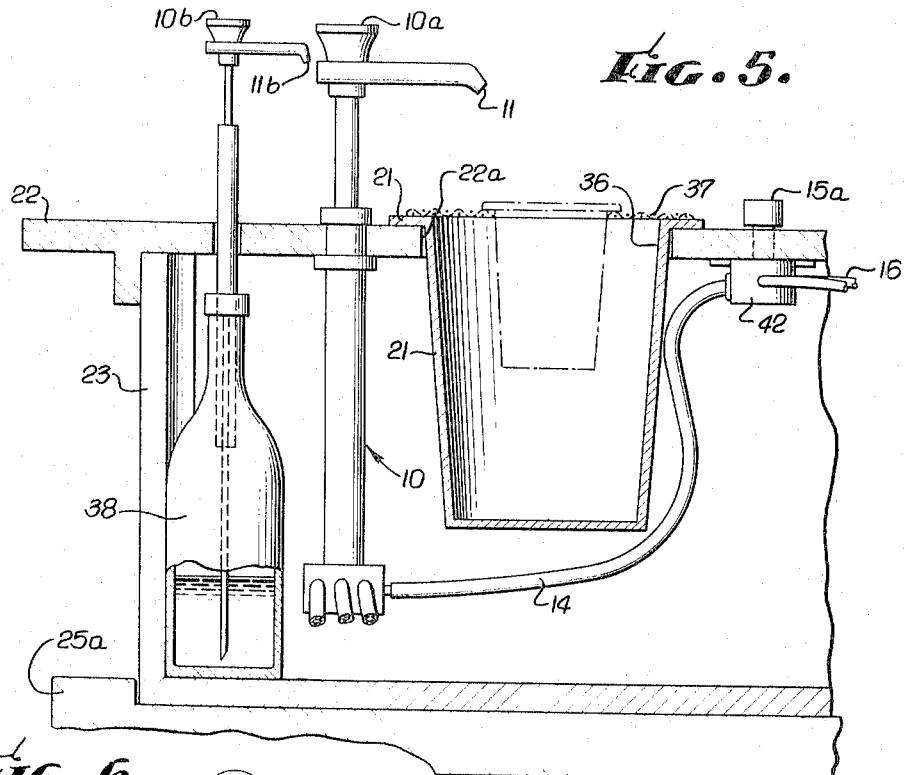
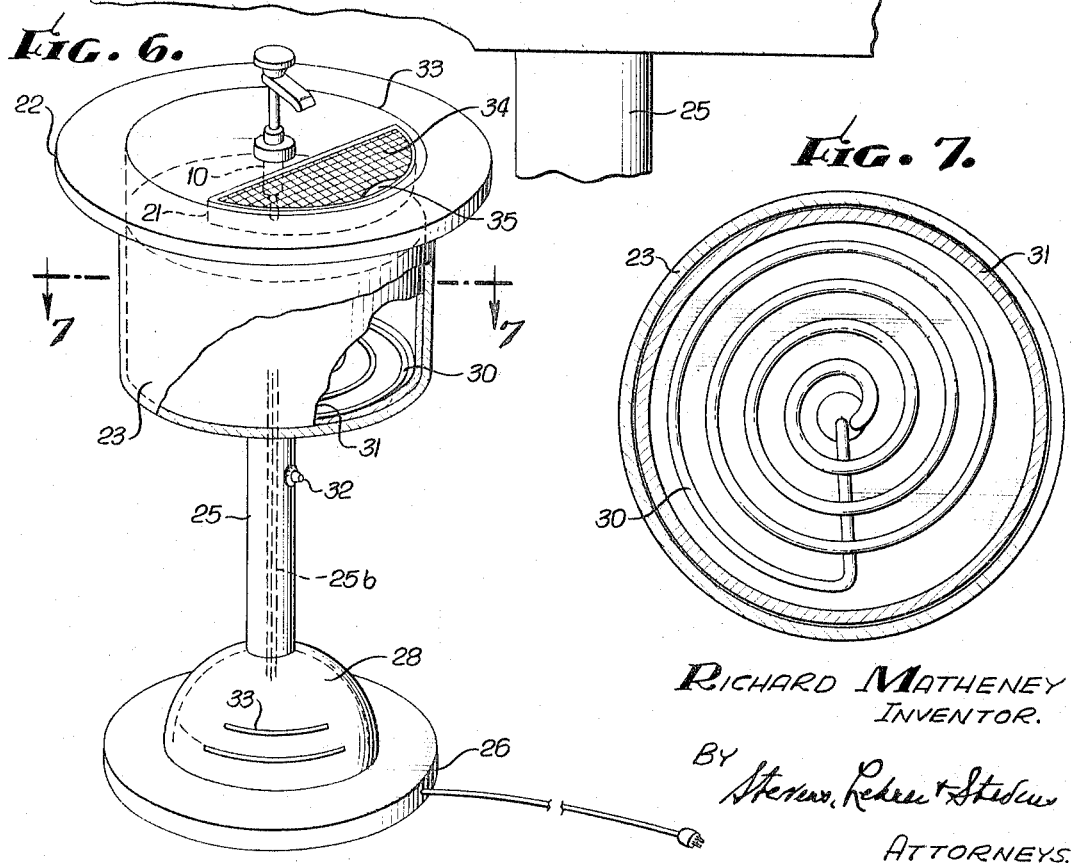

3,302,831
BEVERAGE DISPENSING STANDS
Richard Matheney, 233 W. 64th St.,
Los Angeles, Calif. 90003
Filed Mar. 8, 1965, Ser. No. 438,011
8 Claims. (Cl. 222—108)

My invention relates to beverage serving equipment usable in homes and places of recreation and, more particularly, to equipment of a portable type usable with convenience in one place or another. Accordingly, it is one object of the present invention to provide a beverage serving facility which is self-contained and therefore usable in any place without outside accessories, or merely by making connection with an electric outlet.

A further object is to design the novel equipment in the form of a stand accessible from all sides, the stand containing storage space for bottled beverages and convenient means for dispensing the same.

Another object is to provide a set of controls which are operable to dispense a single beverage or a mixture of beverages from different bottles, all without handling the latter or spilling any liquid in the dispensing area or the surrounding space.

A better understanding of the invention may be gained by reference to the accompanying drawings, in which:

FIG. 1 is a perspective view of one form of the dispensing stand;

FIG. 2 is a top plan view;

FIG. 3 is an enlarged section on the line 3—3 of FIG. 2;

FIG. 4 is a top plan view, on a magnified scale, of a control knob seen in the upper central portion of FIG. 1;

FIG. 5 is an enlarged section on the line 5—5 of FIG. 2;

FIG. 6 is a perspective view of a modification of the stand illustrated in FIG. 1, showing the use of a beverage chilling facility; and FIG. 7 is an enlarged section on the line 7—7 of FIG. 6.

Referring specifically to the drawings, 25 denotes the center post of the stand, and 26 its base. The stand has a circular top 25a which is recessed to seat a housing 23 surmounted by a circular table 22. The latter has a center opening 22a for receiving a receptacle 21 for catching overflow or dripping in the beverage dispensing zone over the table; and the receptacle 21 has a screened top 37 perforated for the support of a paper or plastic cup 36 designed to receive a serving of beverage.

The housing 23 is designed to receive an assortment of bottled beverages, the bottles being deposited by way of the opening 22a while the receptacle 21 is out. Thus, FIG. 5 shows a beverage bottle 38 equipped with a plunger-type pump 10b for dispensing the bottle contents by way of a faucet 11b. FIG. 2 shows the plunger of the pump 10b and also the plunger 10b of a companion single-bottle facility. The plunger tops would, of course, be labeled according to the contents of the bottles they represent.

FIG. 2 also shows an array of bottles 18 and 19 in pairs, one pair being marked 18a and 19a, the next pair 18b and 19b, and so on. Each pair of bottles 18 and 19 has contents designed to be mixed to form a desired beverage or the basic mixture for such a beverage. Each pair of bottles has siphon tubes 16 entering a valve 42 (see FIG. 3) formed with a rotatable knob 15a above the table 22. The valve admits the liquids from the tubes 16 in desired proportions as the knob is turned; and a larger delivery tube 14 leads from the valve 42 into a master pump 10 located between the side pumps 10b and having a plunger 10a at the top. The pump 10 is shown in the top portion of FIG. 1 and at left-center in FIG. 5; and its operation draws liquids in the desired proportions from such pairs of the bottles 18 and 19 as have their knobs turned to passage-opening positions in the valves 42. The knob 15a in FIG. 4 is shown pointing to one beverage, with the positions of another beverage and a mixture of the two indicated.

FIG. 6 shows a modification of the dispensing stand wherein a single pump 10 is employed and a segmental waste receptacle 35—with a screened top 34—is used. The modified stand employs a chilling unit (not shown) in a chamber 28 over the base 26, the chamber having vents 33. Tubes 25b procure supply and return communication between the chilling unit and a coil 30 in the housing 23; and a control knob 32 is carried by the post 25 for regulating the output of the chilling unit by means of suitable wiring (not shown). The chilling installation is, of course, also applicable to the main form of the stand for chilling the beverages in the various bottles deposited therein.

It is now apparent that the novel dispensing stand has a number of advantageous features. First, it is a mobile piece of equipment which can be used in any room and connected for operation from any electric outlet when fitted with a chilling facility. Further, it is a storage facility for various beverage bottles often kept in different places in a home or recreation center. Further, it eliminates the handling of bottles, the work of mixing from one or another, and the care required to avoid spilling or overfilling. Further, a dispensing zone similar to a soda fountain service is had on the table of the stand, with the choice of beverages, mixtures and proportions of the same available as desired. Further, the table and housing may be rotated as one to serve persons on different sides of the stand. Further, the stand can also form part of a bar or counter by simply providing an opening into which the stand may be deposited. Finally, the assembly of the dispensing equipment is simple and of a character to be maintained in a sanitary condition.

I claim:

1. A beverage serving facility comprising a stand formed with a top, a housing mounted on the latter and covered by a table, the housing adapted to contain a variety of beverages in bottles, and means for dispensing selected beverages and mixtures thereof in the area over the table, said means including a set of mixing valves in the housing, siphon tubes from a plurality of said beverage bottles connecting with inlets to the mixing valves, a faucet-type pump on the table and having inlets in the housing, and a conduit from the outlet of each mixing valve to each inlet of the pump.

2. A beverage serving facility comprising a stand formed with a top, a housing mounted on the latter and covered by a table, the housing adapted to contain a variety of beverages in bottles, and means for dispensing selected beverages and mixtures thereof in the area over the table, said means including a set of mixing valves in the housing, siphon tubes from a plurality of said beverage bottles connecting with inlets to the mixing valves, a faucet-type pump on the table and having inlets in the housing, a conduit from the outlet of each mixing valve to each inlet of the pump, and controls for the mixing valves on the table and operable to change the proportion of liquids drawn from said bottles by the operation of the pump or to limit dispensing to designated bottles.

3. A beverage serving facility comprising a stand formed with a top, a housing mounted on the latter and covered by a table, the housing adapted to contain a variety of beverages in bottles, and means for dispensing selected beverages and mixtures thereof in the area over the table, said means including a set of mixing valves in the housing, siphon tubes from a plurality of said beverage bottles connecting with inlets to the mixing valves, a faucet-type pump on the table and having inlets in the housing, a conduit from the outlet of each mixing valve to each inlet of the pump, and knobs rotatable on the table for turning the valves to change the proportion of liquids drawn from said bottles by the operation of the pump or to limit dispensing to designated bottles.

4. A beverage serving facility comprising a stand formed with a top, a housing mounted on the latter and covered by a table, the housing adapted to contain a variety of beverages in bottles, and means for dispensing selected beverages and mixtures thereof in the area over the table, the bottles containing said beverages being arranged in a circular series in the housing, a set of mixing valves in the housing one for each pair of bottles, siphon tubes from each pair of bottles connecting with inlets to the mixing valves, a faucet-type pump on the table and having inlets in the housing, and a conduit from the outlet of each mixing valve to each inlet of the pump.

5. A beverage serving facility comprising a housing including a table top, said housing including means for receiving a plurality of beverage-containers therein, and means on said housing for dispensing beverages and mixtures thereof in the area over said table top, said means including at least one mixing valve on the housing, siphon tubes connected to at least a pair of the beverage-containers and connected for independent communication with said mixing valve, pump means on said table top and including an outlet generally overlying said table top and an inlet in said housing, and a conduit from an outlet of said mixing valve connected to the inlet of said pump means.

6. The structure as claimed in claim 5 in which said table top includes an opening therethrough through which said beverage-containers can be inserted and removed, and a receptacle removably received in said opening, said pump means including an outlet overlying said opening.

7. The structure as claimed in claim 5 in which said pump means is manually operable.

8. The structure as claimed in claim 5 including a stand having a top, said top having a circular peripheral wall, said housing being circular and being rotatably received on said stand top within said peripheral wall whereby said housing can be rotated to serve people disposed about said housing.

References Cited by the Examiner
UNITED STATES PATENTS

| | | | |
|---|---|---|---|
| 123,356 | 2/1872 | Nickels | 222—108 |
| 2,090,665 | 8/1937 | Carter | 222—108 |
| 2,583,687 | 1/1952 | Dobkin | 222—321 X |

ROBERT B. REEVES, *Primary Examiner.*

LOUIS J. DEMBO, HADD S. LANE, *Examiners.*